(12) United States Patent
Laricchia

(10) Patent No.: US 6,338,792 B1
(45) Date of Patent: Jan. 15, 2002

(54) HYDROCARBON SWEETENING PROCESS USING A NOVEL LIQUID COLLECTOR ASSEMBLY

(75) Inventor: Luigi Laricchia, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/557,995

(22) Filed: Apr. 24, 2000

Related U.S. Application Data

(62) Division of application No. 09/280,956, filed on Mar. 29, 1999.

(51) Int. Cl.[7] .............................................. E10G 27/00
(52) U.S. Cl. ...................................... 208/189; 208/183
(58) Field of Search ................................ 208/206, 108, 208/183, 189

(56) References Cited

U.S. PATENT DOCUMENTS

| | | | | |
|---|---|---|---|---|
| 2,988,500 A | * | 6/1961 | Gleim et al. ................. | 208/206 |
| 3,598,539 A | * | 8/1971 | Pizzato ......................... | 23/388 |
| 4,239,614 A | * | 12/1980 | Hutchings | |
| 5,035,867 A | * | 7/1991 | Vu et al. ..................... | 422/200 |
| 5,112,578 A | * | 5/1992 | Murayama et al. ......... | 422/197 |
| 5,637,278 A | * | 6/1997 | Smith et al. ................ | 422/144 |

* cited by examiner

Primary Examiner—Helane E. Myers
(74) Attorney, Agent, or Firm—John G. Tolomei; Frank S. Molinaro

(57) ABSTRACT

A novel liquid collector assembly has been developed for a reactor used in the sweetening of sour hydrocarbons (e.g. sour gasoline). This refinery process normally involves contacting a reaction liquid, comprising both aqueous (caustic solution) and organic (hydrocarbon) phases, with a fixed bed of oxidation catalyst. The collector assembly design, comprising a piping manifold and a plurality of dependent, vertically aligned, and perforated conduits, allows for improved separation of the reaction products into essentially pure treated hydrocarbon and spent alkaline reagent streams. If sodium hydroxide is used as caustic solution, for example, the treated hydrocarbon product will normally contain less than 1 ppm by weight of sodium.

10 Claims, 2 Drawing Sheets

HYDROCARBON SWEETENING PROCESS USING A NOVEL LIQUID COLLECTOR ASSEMBLY

CROSS-REFERENCE TO RELATED APPLICATION

This application is a division of co-pending U.S. application Ser. No. 09/280,956 filed on Mar. 29, 1999 which is incorporated by reference in its entirety.

FIELD OF THE INVENTION

The present invention relates to a novel process using an improved liquid collector assembly for phase separation of a two-phase (aqueous and organic) reaction product. The reactor and collector assembly are particularly applicable to the separation of caustic and hydrocarbon phases comprising the reactor effluent liquid streams in processes for the sweetening of sour petroleum fractions.

BACKGROUND OF THE INVENTION

The sweetening of sour petroleum distillates involves improving their odor quality through the oxidation of mercaptan compounds (thiols) contained therein to disulfides. Of significant industrial importance in this field is the fixed-bed catalytic oxidation process described in U.S. Pat. No. 2,988,500. In this treatment process, mercaptans contained in petroleum distillates (e.g. sour gasoline) are reacted with an oxidizing agent (e.g. air) in the presence of an alkaline reagent (e.g. caustic solution). The oxidation reaction occurs upon passing this two-phase (hydrocarbon/aqueous) liquid mixture containing the dissolved oxidizing agent over a fixed bed of catalyst. An issue of primary importance therefore relates to the efficiency of separation of the liquid phases after completion of the sweetening reaction.

In conventional distillate treating technology, this separation occurs primarily external to the reactor, where a settler vessel allows the reactor effluent to establish phase equilibrium. The heavier aqueous phase containing the alkaline reagent, once a sufficient level is established in the settler, can be intermittently recycled to the reactor inlet. In this case the recycled caustic solution is recombined with the petroleum distillate feed and oxidizing agent before the reactor inlet. Typically, the same charge of caustic solution can be recycled several times for use in the oxidation reaction, before disposal and replacement with fresh material are required.

Newer developments in treating, however, have led in many cases to a more economically favorable operation using continuous, once-through flow of the alkaline reagent. This has been achieved through the minimization of caustic solution usage and consequently the reduction of caustic flow through the reactor. A major process modification associated with this "minimum alkalinity" mode has been a change in the point of separation between the aqueous and organic phases. Whereas the conventional technology relied on a separation external to the reactor, the modified reduced caustic flow processes allowed for the direct collection of separate phases after completion of the mercaptan oxidation reaction. Generally, these later-developed processes have been most suitable for the sweetening of relatively light hydrocarbon fractions such as gasoline.

The removal of reaction products as essentially pure aqueous and hydrocarbon streams after the sweetening reaction has been accomplished using an appropriately designed liquid collector assembly. The primary function of the liquid collector has been to maximize the surface area of conduits through which the hydrocarbon phase of the reaction mixture is forced to pass before exiting the reactor. During collection, the distribution of the treated hydrocarbon over a broad area has been found to promote essentially complete disengagement of the caustic solution from the hydrocarbon phase. This desired effect has been attributed to the reduction of the liquid flux (flow rate per unit area) through conduits of the liquid collector assembly. Spent caustic solution, which constitutes the heavier phase of the reaction mixture, normally flows by gravity past the collector assembly. This stream is withdrawn through a caustic drain located at the bottom of the reactor, below the liquid collector assembly where the hydrocarbon portion is separated and removed. In the interest of product quality, it is generally required that the treated, or sweetened, hydrocarbon product contain less than 1 ppm by weight of the metal cation (e.g. sodium) used for the caustic solution.

A second design consideration for the liquid collector assembly has been the separation of the treated hydrocarbon from the catalyst particles used in fixed-bed mercaptan oxidation processes. This is achieved using conduits of the liquid collector assembly that have perforated surfaces, where perforations of the appropriate size are fabricated according to methods known in the art.

A common type of liquid collector assembly comprises a plurality of cylindrical conduits extending horizontally into the reactor catalyst bed about a common transverse plane of the reactor at a constant height above the caustic drain. The cylindrical conduits have perforated surfaces, are each closed at one end, and are each in common flow communication with a piping manifold at the opposite end. The perforated conduit surfaces therefore promote both the hydrocarbon/caustic and liquid/solid phase separations required for the hydrocarbon sweetening process. Typically, flanged connections are used between the piping manifold and conduits, so that damage to the perforated surface of any particular conduit is easily remedied through replacement without welding. The main drawback of using laterally extending conduits, however, has been the limited allowable surface area for effecting the phase separation of hydrocarbon and aqueous components.

Another type of collector that is less frequently used is a so-called "basket" construction where a cylindrical surface having a diameter smaller than that of the reactor and concentric with the reactor is affixed to the lower section of the reactor wall. The basket extends along a portion of the reactor length, allowing the separation of the treated hydrocarbon from the caustic solution and catalyst particles to take place in the annular region between the perforated conduit surface and reactor wall. A well-recognized problem with such basket-type designs is their substantial maintenance requirement. Any damage to the perforated surface of the conduit necessitates careful welding procedures to restore the surface properties. Removal of the basket for repairs is impractical when it is a permanently affixed structure within the reactor. Furthermore, inspection of the reactor wall section that is covered by the basket becomes impossible. This unavailability of a portion of the reactor wall is recognized as a significant drawback, since examination of the reactor inner surface is very important for purposes such as the detection of corrosion.

SUMMARY OF THE INVENTION

The reactor of the present invention applies to processes where organic and aqueous liquids are combined to carry out a reaction and thereafter must be phase separated as completely as possible. Applicant has determined that the use of a liquid collector assembly with conduits extending vertically along part of the vessel length allows for a relatively large surface area over which to cause the necessary phase separation. This collector design contributes to enhanced separation efficiency through the orientation of the conduits parallel to the liquid flow, which prevents the direct impingement of liquid flowing normal to the perforated surface. Also, the positioning of the piping manifold directly above the conduits further shields the conduits to some extent from the direct liquid flow path. Additionally benefiting the desired phase separation is the collection of reaction liquid from within a catalyst bed at radially and axially dispersed points. Lastly, unlike the previously mentioned basket design, maintenance and replacement of conduits are simple procedures.

Aside from design simplicity and ease of maintenance, however, the main advantage of the novel reactor and associated liquid collector design of the present invention lies in the increased liquid throughput allowable for a given reactor size. Until now, the reactor liquid linear velocity, which is calculated by dividing the total liquid volumetric flow rate by the reactor cross sectional area, has been limited, due to the decreasing caustic separation efficiency accompanying increasing flux through the liquid collector assembly conduits. With the use of vertical conduits, surface area is increased, so that the flux for a given flow rate is reduced. In fixed-bed mercaptan oxidation processes in particular, the present invention can now permit operation with superficial liquid velocities approaching values at which the caustic solution and hydrocarbon feed will begin to emulsify. This occurs typically at about 15–30 meters per hour, depending on a number of process variables. Alternatively, the reactor length to diameter ratio (L/D) for a given capacity hydrocarbon sweetening operation can be increased using the reactor of the present invention, resulting in greater design flexibility. This allows for the use of conventional reactor sizes and consequently significant cost savings, since it is usually cheapest to design a reactor of a given volume with an L/D of about 2–4.

In one embodiment, therefore, the present invention is an improved reactor for treating a sour hydrocarbon containing a mercaptan. The reactor comprises a vertically oriented vessel and a particle retention space for retaining a fixed bed of catalyst particles. The vessel also comprises an inlet that communicates with the upper portion of the vessel for contacting a downwardly flowing liquid with the fixed bed. A drain communicates with the bottom of the vessel for withdrawing a first portion of a liquid from the bed. A piping manifold extends into the particle retention space and communicates with a plurality of dependent conduits having perforated surfaces and extending vertically along part of the vessel length. The vessel further comprises a manifold outlet that communicates with the manifold, where the manifold outlet is for withdrawing a second portion of a liquid from contact with the fixed bed.

In a preferred embodiment the present invention is an improved reactor as described above, where the piping manifold, horizontally traversing the particle retention space, comprises a plurality of pipes extending radially from a common connection providing flow communication among the pipes. A plurality of dependent conduits extend downwardly from each pipe for communication therewith and the conduits have perforated surfaces comprising profile wire, fritted metal, or slotted metal.

In another embodiment the present invention is a process for treating a sour hydrocarbon containing a mercaptan. The process comprises contacting the hydrocarbon, oxidizing agent, and alkaline reagent at oxidizing conditions with a fixed bed of catalyst effective to oxidize the mercaptan and yield a treated hydrocarbon product and a spent reagent. A plurality of perforated surfaces, extending vertically over a portion of the fixed catalyst bed and dispersed over the catalyst bed cross section, is used to collect the treated hydrocarbon product. A piping manifold is then used to withdraw this product.

DETAILED DESCRIPTION OF THE INVENTION

Figure 1:
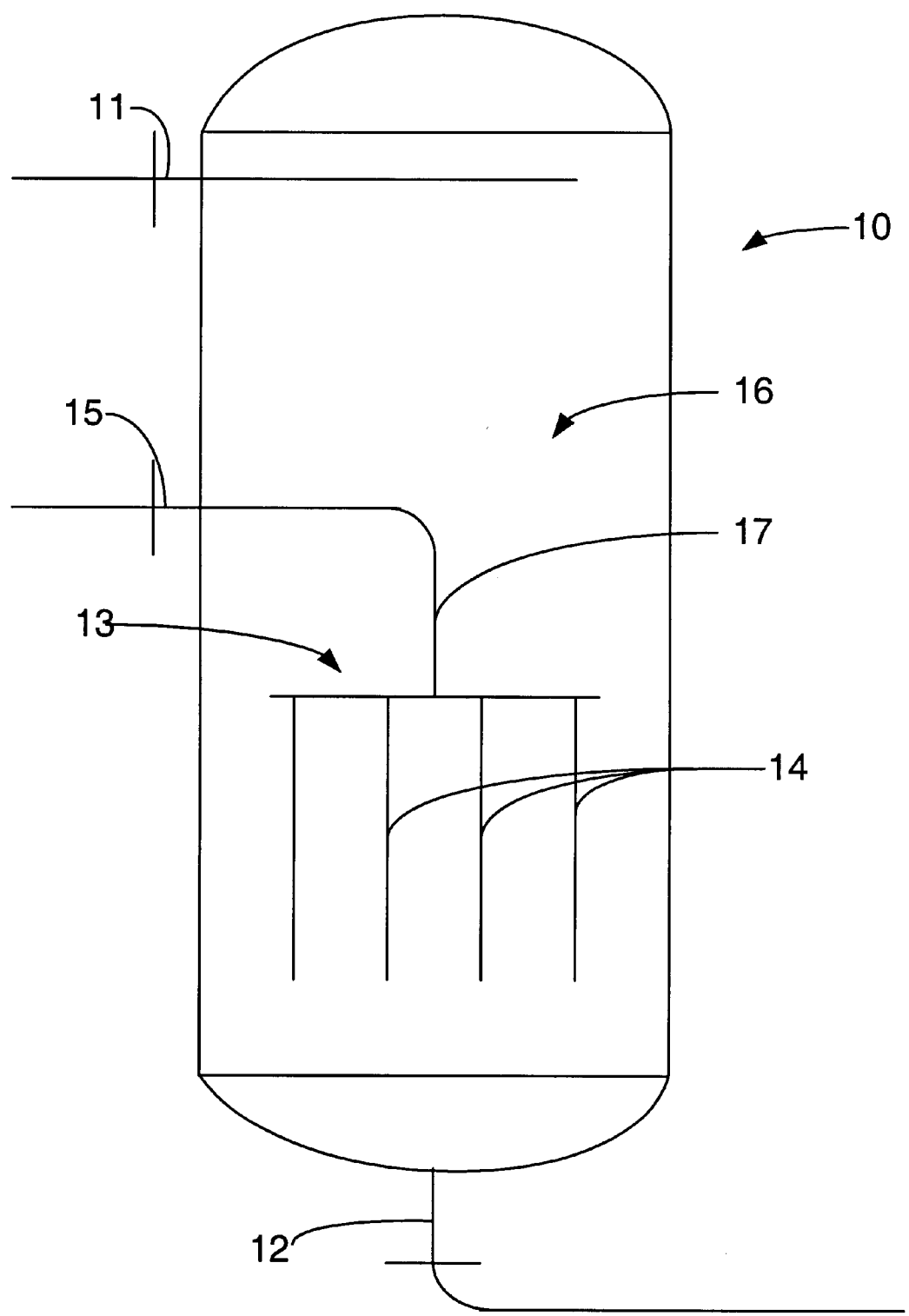
FIG. 1 is a sectional elevation schematically representing a reactor of the present invention.

The reactor of the present invention is generally useful for fixed-bed catalytic processes (e.g. hydrocarbon sweetening) where it is desired to separate downwardly flowing liquid reaction products, comprising separate phases, on the basis of their relative densities. The reactor includes a vertically oriented vessel, normally cylindrical in shape, with inlet (or distributor), liquid collector, and drain pipe connections for feeding liquid reactants to, and withdrawing separate reaction products from, the vessel. Other necessary connections to the vessel, such as vents, manways, and equalization lines, that are required for particular applications, are of course within the scope of the present invention.

The vessel length and diameter are based, as is understood in the art, on variables that relate specifically to a particular intended process application. For example, the vast majority of the vessel volume must encompass a space for retaining a bed of catalyst. The dimensions of this region are determined by the total liquid flow rate, the catalyst liquid hourly space velocity (LHSV), and the desired liquid linear velocity. LHSV is the hourly volumetric liquid feed flow rate divided by the catalyst volume and represents the reciprocal of the average time of the reaction liquid within the fixed catalyst bed. Normally, the axial length, measured in the vertical direction, of the catalyst retention space accounts for about 70% to about 95% of the vessel length, measured as the vessel tangent length as understood in the art for cylindrically-shaped vessels with elliptically-shaped top and bottom heads. The remaining axial length is most commonly used to provide room for support structures for the catalyst, inert packing materials, and distribution zones.

A key feature of the reactor of the present invention is the liquid collector assembly, which serves the critical purpose of separating downwardly flowing hydrocarbon and aqueous phase reaction products. This device extends into the reactor vessel generally within the catalyst retention space provided for the catalyst bed but above the reactor drain. The liquid collector is supported by a continuous support ring welded to the inside wall of the reactor in a horizontal position, discontinuous support brackets, or other means for supporting reactor internal structures known in the art. The collector assembly comprises a piping manifold, manifold outlet, and a plurality of dependent conduits having perforated surfaces that extend vertically along part of the reactor vessel length and are distributed about the reactor cross section.

It is generally preferred that the vertical conduits are in flow communication with a piping manifold having an "X"

type of configuration, where four pipes extend radially from a common junction and at right angles to each other. Each pipe of the manifold is normally in communication with a minimum of one dependent conduit, for a minimum total of four conduits. The number of dependent conduits can increase in cases where larger-scale operations requiring reactor vessels of greater than 2 meters in diameter. Such vessels can physically accommodate a greater number of conduits, although the need for more than four total conduits is determined by the total reactor liquid flow rate, and consequently liquid flux through the conduit surface. For example, it may be desirable to employ at total of 16 conduits, providing twice the surface area for separation of the aqueous and organic phases, when a 4-meter diameter treating reactor vessel is employed. Alternatively, conduit diameter can be varied to achieve a given surface area.

It is preferred to use conduits having a length from about 5% to about 50% of the length of the particle retention space, depending the total surface area needed to effect the separation of the organic and aqueous liquid phases. The conduits generally should extend downward to a level from about even with, to about 0.5 meter above, the reactor bottom tangent line. The conduit diameter, a function of the total number of conduits and desired surface area, typically ranges from about 1 to about 24 inches. Perforations in the conduit surfaces are necessary to allow passage of the liquid reaction product but not the catalyst particles. The types of catalyst particles normally used in hydrocarbon sweetening processes generally have diameters of larger than 0.5 millimeters, and a typical range of catalyst particle diameters is from about 0.75 to about 2.5 millimeters. Therefore, to prevent passage of the smallest catalyst particles into the liquid reaction products, the perforations must be in general smaller than 0.5 millimeters, and preferably smaller than about 0.25 millimeters.

Perforated surfaces can comprise profile wire, fritted metal, slotted metal or other forms known in the art. It is preferred to use profile wire in a form known in industry as a Johnson screen (available from U.S. Filter Company, St. Paul, Minn. USA). Johnson screen profile wire provides a highly regular slotted surface that is resistant to liquid flow blockage (plugging) due to extended contact with catalyst particles.

The details of the reactor of the present invention can be referenced in the drawings. FIG. 1 is a schematic representation of the reactor of the present invention, comprising a vertically oriented vessel 10, for contacting a downwardly flowing liquid with a fixed bed (not shown) of particles (e.g. oxidizing catalyst) in a catalyst retention space 16. A reactor inlet 11 injects and distributes, into the upper portion of the vessel, liquid reactants (e.g. sour hydrocarbon and an alkaline reagent), allowing them enter the catalyst retention space 16. A drain 12 withdraws a portion, essentially the heavier aqueous phase, of the liquid from the bottom of the vessel. A piping manifold 13 retains a plurality of dependent conduits 14 that occupy the catalyst retention space 16. A manifold outlet 15, withdraws a portion, essentially the lighter organic phase, of the liquid from the vessel, via a manifold pipe 17. The dependent conduits 14, piping manifold 13, and manifold outlet 15, provide a liquid collector assembly.

Figure 2:
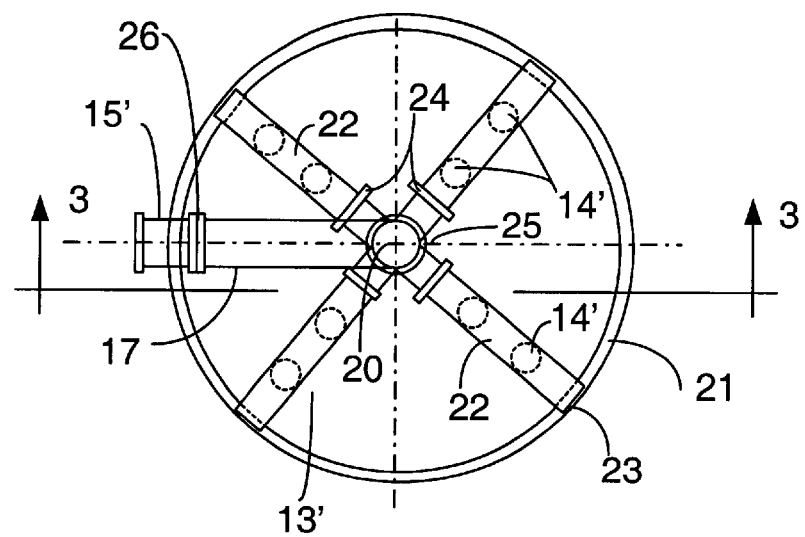
FIG. 2 is a top view of a reactor liquid collector assembly, of the type used in the reactor of FIG. 1.
Figure 3:
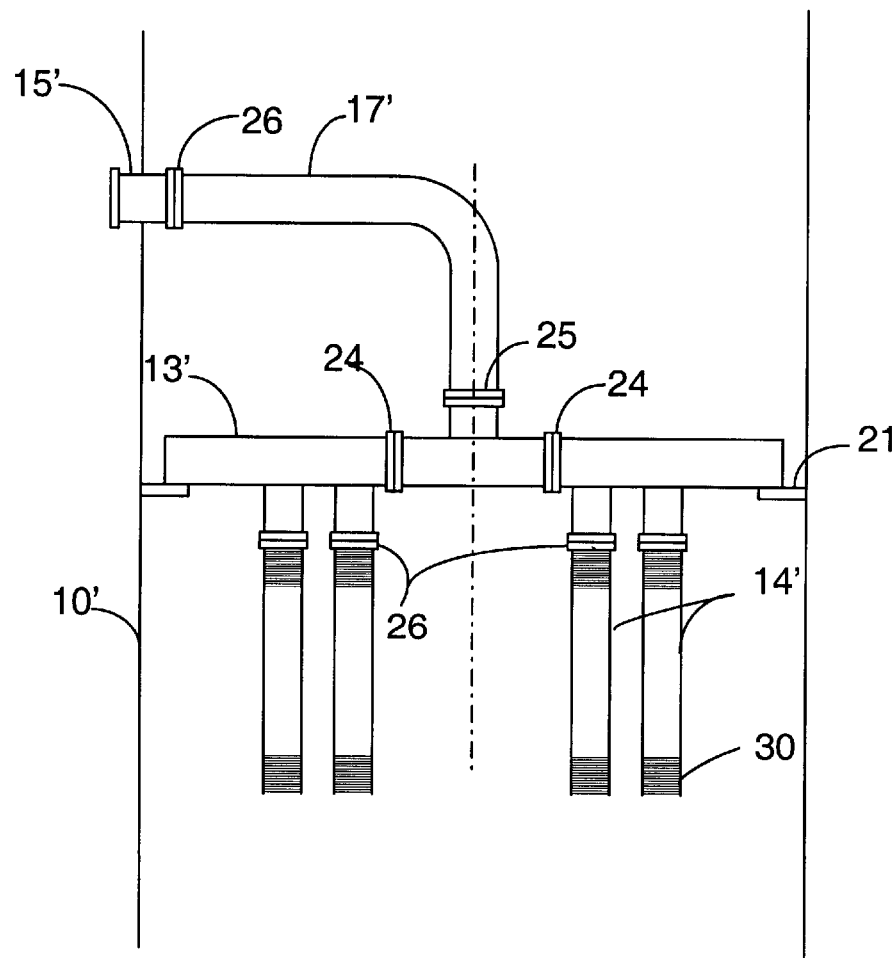
FIG. 3 is an elevation view of the liquid collector assembly of FIG. 2 taken along lines 3—3.

FIG. 2 depicts a plan view of a preferred piping manifold design for a liquid collector assembly. In this "X" type arrangement, the piping manifold 13' comprises four pipes 22 extending radially and at right angles from a common junction 20 providing flow communication. Each pipe is closed at its end 23 opposite the junction 20. Flanged connections 24, 25 typically join the radially aligned pipes 22 to the common junction 20 and the junction to the manifold pipe 17'. A flange 26 connects the manifold pipe 17' to the manifold outlet 15'. FIG. 3 illustrates the vertical alignment of the dependent conduits 14', which have perforated surfaces 30, preferably comprising profile wire. A support ring 21 supports the liquid collector assembly in the vessel 10'. Flanges 26 normally connect dependent conduits 14 to the piping manifold 13.

The process of the present invention is directed toward treating a sour hydrocarbon feed stock containing a mercaptan. Hydrocarbon feed stocks include both straight run and cracked petroleum fractions such as naphtha, straight run gasoline, cracked gasoline, and other streams where the oxidation of mercaptan compounds contained therein is desired for quality enhancement. Mercaptan levels in sour hydrocarbons typically contribute from about 10 to about 1000 ppm (by weight) of sulfur to the feed stock.

The conversion of mercaptans to disulfides is achieved through contact of the mercaptan-containing hydrocarbons with an alkaline reagent and an oxidizing agent. Preferred alkaline reagents are caustic solutions such as sodium hydroxide, potassium hydroxide, and ammonium hydroxide. Sodium hydroxide is most preferred based on its cost and availability, and is normally used in concentrations from about 1% to about 5% by weight in aqueous solution. The preferred oxidizing agent is oxygen gas, and, for convenience, air can be used by dissolving an effective amount in the liquid mixture comprising feed stock and alkaline reagent. By an effective amount of air is meant that sufficient oxygen is contained therein to oxidize from about 50% to about 300% of any sulfides and mercaptans present in the liquid mixture. Sulfides result from the reaction between the alkaline reagent and trace hydrogen sulfide gas dissolved in the hydrocarbon feed stock. For example, if aqueous sodium hydroxide solution is used as the alkaline reagent, the presence of hydrogen sulfide in the hydrocarbon will yield sodium sulfide. Sulfide reaction products of hydrogen sulfide and any of the aforementioned alkaline reagents are readily oxidized, under the oxidizing conditions of the process of the present invention, to thiosulfates. Thus, sodium sulfide is converted under the mercaptan oxidation conditions to sodium thiosulfate.

In general, as the mercaptan sulfur level in petroleum hydrocarbon feed stocks increases, the oxygen requirement also increases. Consequently, the pressure necessary to dissolve the oxygen, injected into the liquid reaction mixture as air, increases as well. Absolute reaction pressure can vary from about atmospheric pressure to about 30 atmospheres. Other oxidizing conditions associated with the process of the present invention are a temperature from about 30° C. to about 100° C. and a catalyst liquid hourly space velocity from about 0.1 hr$^{-1}$ to about 10 hr$^{-1}$. As mentioned, the process is carried out in the presence of an oxidizing catalyst contained in the reactor.

Suitable catalyst compositions preferably comprise a metal phthalocyanine or sulfonated derivative thereof (e.g. cobalt phthalocyanine or cobalt phthalocyanine disulfonate) supported on a solid carrier (e.g. activated carbon) which is essentially inert in the mercaptan oxidation reaction environment. Types of catalysts are taught in detail in U.S. Pat. No. 2,988,500 and various improvements upon these formulations are also well known in the art. The process employs a fixed bed of catalyst particles preferably essentially spherical in shape, although other catalyst shapes are possible. The use of an appropriate oxidation catalyst under oxidation conditions described above will yield a treated (or sweetened) hydrocarbon having preferably less than 1 ppm by weight of sulfur as mercaptan sulfur.

The process uses the reactor of the present invention to collect the treated hydrocarbon product from a plurality of perforated surfaces, extending vertically over a portion of the fixed catalyst bed and dispersed over the catalyst bed cross section, into a piping manifold to withdraw the treated hydrocarbon product. In terms of the separation of the aqueous phase from the hydrocarbon phase, it is normally preferred that the treated hydrocarbon contains below about 3 ppm by weight of alkaline reagent. Thus, if sodium hydroxide is used as the alkaline reagent, a finding of less than 1 ppm by weight of sodium in the treated hydrocarbon represents a preferred mode of operation.

What is claimed is:

1. A process for treating a sour hydrocarbon containing a mercaptan, the process comprising:
   a) passing the hydrocarbon through an inlet into an upper portion of a reactor comprising a vertically oriented vessel;
   b) contacting the hydrocarbon, an oxidizing agent, and an alkaline reagent at oxidizing conditions with a fixed bed of catalyst effective to oxidize the mercaptan and yield a treated product and a spent reagent;
   c) withdrawing the spent reagent from a lower portion of the vessel through a drain;
   d) receiving the treated product through a plurality of perforated surfaces that extend vertically over a portion of the fixed catalyst bed and are dispersed over the catalyst bed cross section, and;
   e) collecting the treated product into a piping manifold to withdraw the treated hydrocarbon product from the vessel.

2. The process of claim 1 where the sour hydrocarbon is selected from the group consisting of naphtha, straight run gasoline, cracked gasoline, and mixtures thereof.

3. The process of claim 1 where the alkaline reagent is a caustic solution selected from the group consisting of sodium hydroxide, potassium hydroxide, ammonium hydroxide, and mixtures thereof.

4. The process of claim 3 where the caustic solution is sodium hydroxide.

5. The process of claim 4 where the treated product contains less than about 1 ppm of sodium by weight.

6. The process of claim 1 where the catalyst comprises a solid carrier having a metal phthalocyanine compound deposited thereon.

7. The process of claim 6 where the metal phthalocyanine compound is cobalt phthalocyanine, cobalt phthalocyanine sulfonate, cobalt phthalocyanine disulfonate, vanadium phthalocyanine, vanadium phthalocyanine sulfonate, or vanadium phthalocyanine disulfonate.

8. The process of claim 6 where the solid carrier is activated carbon.

9. The process of claim 1 where the oxidizing conditions include a temperature from about 30° C. to about 100° C., an absolute pressure from about 1 to about 30 atmospheres, and a liquid hourly space velocity from about 0.1 to about 10 $hr^{-1}$.

10. The process of claim 1 further comprising withdrawing the spent reagent from below the fixed catalyst bed.

* * * * *